S. C. CARY & H. H. BRAND.
CORRUGATED FASTENER.
APPLICATION FILED JULY 2, 1915.

1,295,268.

Patented Feb. 25, 1919.

WITNESS:
A. C. Abbott

INVENTORS
Spencer C. Cary and
Herman H. Brand
BY
Edson Bernhard
ATTORNEYS

UNITED STATES PATENT OFFICE.

SPENCER C. CARY AND HERMAN H. BRAND, OF BROOKLYN, NEW YORK, ASSIGNORS TO CARY MANUFACTURING CO., OF BROOKLYN, NEW YORK, A CORPORATION OF NEW YORK.

CORRUGATED FASTENER.

1,295,268.    Specification of Letters Patent.    Patented Feb. 25, 1919.

Original application filed December 31, 1913, Serial No. 809,617. Divided and this application filed July 2, 1915. Serial No. 37,682.

*To all whom it may concern:*

Be it known that we, SPENCER C. CARY and HERMAN H. BRAND, both citizens of the United States, residing at the city of New York, borough of Brooklyn, county of Kings, and State of New York, have invented a certain new and useful Corrugated Fastener, of which the following is a specification.

The invention of this application is a division of prior applications filed by us pertaining to machines and methods of producing corrugated fasteners, one of which prior applications is serially numbered 809,617 and another 865,678, filed Dec. 31, 1913, and Oct. 8, 1914, respectively, whereas a still further application is serially numbered 19377, filed April 5, 1915.

In the two applications first named, the inventions disclosed therein pertain to machines, whereas the third application is for a method, wherein a length of corrugated metal stock is treated on one edge to produce bevels on the convex bends by means and by a procedure other than by grinding, and thereafter metal is removed from the stock by the operation of a set of dies which act to impart bevels to the concave surfaces of the stock, and a further die operates to compress or swage the points of the resulting teeth so as to sharpen said points and to centralize them in the plane of the medial line of the fastener. The article produced by the aforesaid machines and in accordance with the aforesaid method constitutes the subject matter of this application. Said article is characterized by at least two salient features of novelty, one of which is a continuous cutting edge on the saw tooth edge of the fastener and resulting from the bevels produced upon the concave surfaces as well as upon the convex surfaces of the corrugated metal, and the other is the sharpened points produced on the teeth, which teeth are swaged in order to sharpen the points and to position them with accuracy in the plane of the medial line of the fastener.

The drawings hereto annexed illustrate the article on an enlarged scale for the sake of clearness, wherein—

Figure 1:
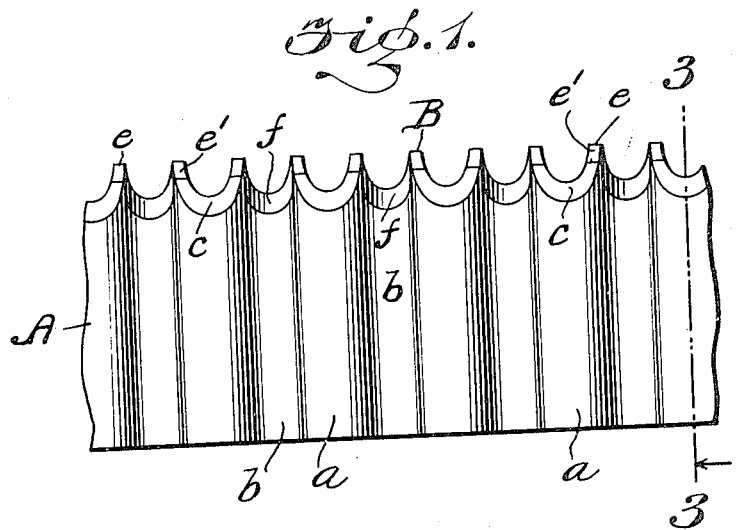
Figure 1 is a side elevation.
Figure 2:
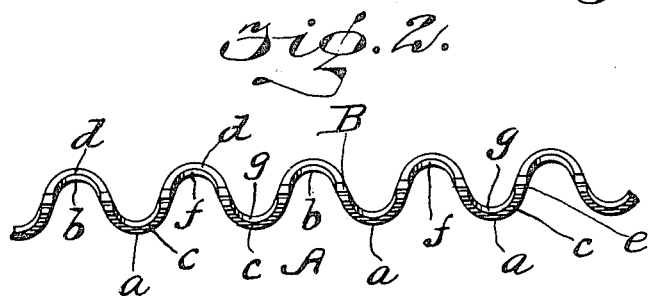
Fig. 2 is a plan looking at the saw tooth edge.

The drawings illustrate in Figs. 1 and 2 a length of corrugated metal A one edge of which is manipulated, treated or prepared to produce saw teeth B in accordance with this invention.

As is well known, it has been customary heretofore to produce saw tooth fasteners from corrugated metal stock by grinding the two surfaces of the metal adjacent to one edge portion thereof, as a result of which grindings reversed bevels are produced on the convex bends of said corrugated stock. Such grinding operations are objectionable for many reasons, chief among which are that the metal becomes heated to such an extent as to draw the temper thereof; the process is slow, tedious and expensive, and the dust surrounding the grinding machine is detrimental to the workmen and seriously objectionable in the factory.

It is apparent, furthermore, that the reduction of the metal by plane surfaced grinding wheels takes place along the high parts or convex bends only of the corrugated stock, for the reason that such plane surfaced wheels are incapable of acting upon the low parts or concave surfaces of the metal, as a result of which the bevels are produced upon the convex surfaces, and not upon the concave surfaces of the corrugated metal, hence prior saw tooth fasteners were not provided with a continuously beveled driving edge, i. e. said prior saw tooth fasteners were not characterized by a continuous cutting edge along the driving edge thereof.

The corrugated fastener of the present invention consists of a length of metal stock of the required width, gage and temper, said stock being corrugated, i. e. it is continuously bent and rebent with respect to the longitudinal medial line of the metal. As a result, the corrugated metal is characterized on each surface thereof by convex bends $a$ and concave bends $b$, the convex bends alternating with the concave bends.

The metal along one edge thereof is beveled at $c\ d$, one bevel $c$ being upon one surface of the stock and the other bevel $d$ being upon the opposite or reversed surface thereof, and said two bevels being reversed to each other, whereby the removal of metal along certain definite lines results in the formation of saw teeth B. With the corrugated metal in a certain position, and looking at one side thereof, the bevels $c$ are produced upon the convex bends $a$ of that surface at which the operator is looking; whereas with the corrugated metal in the same position but looking at the opposite or reversed surface thereof, the other bevels $d$ are also upon the convex bends on said surface at which the operator is viewing the fastener, all as will be clearly apparent by an inspection of Fig. 2.

The bevels $c\ d$ upon the respective faces of the corrugated metal are equal in angularity, i. e. the angle of bevel $c$ is the same as the angle of bevel $d$, and, accordingly, the points $e$ of the saw teeth B are, or should be, in the plane of the medial line of the fastener.

As disclosed in application Serial No. 809,617, the bevels $c\ d$ are produced upon the respective surfaces of the corrugated metal simultaneously with the removal of the metal from one edge of the corrugated stock by the action of rotary milling cutters.

In the other applications Serial Nos. 865,678 and 19377 we disclose means and methods whereby the corrugated metal is first swaged to produce the bevels and thereafter the metal is cut out on definite lines to form the teeth B.

The means employed in our application Serial No. 809,617 to produce the teeth on the corrugated metal result, also, in certain rough edges on the toothed edge of the metal, and occasionally the points of the teeth are deflected to one side or the other of the medial plane of the fastener. To remedy these objections in the invention of the first application aforesaid, and to carry on the process in the two last applications referred to, we subject the metal to further treatment, and in so doing we secure another result important in a commercially successful article of this character, i. e. a continuously beveled cutting edge along the saw tooth portion of the fastener, or that part of the fastener which is first driven into the material and herein referred to as the driving edge.

In this connection it is to be observed that the bevels $c\ d$, produced either by the rotary milling cutters of application 809,617 or by swaging and subsequently cutting out the metal by the dies of applications Serial Nos. 865,678 and 19377, are upon the convex bends $a$ of the two surfaces of the corrugated metal, there being no bevels upon the concave bends $b$ of the corrugated metal; but one characteristic feature of the new fastener consists in bevels $f\ g$ on said concave bends of the corrugated metal at the driving edge thereof, thereby producing a driving edge which is continuously beveled so as to result in a sharp cutting edge.

Referring now to the machine of application Serial No. 809,617, the dies referred to therein as the bur-removing dies are characterized, first, by a corrugated surface conforming to the surface of the corrugated metal so as to operate upon the convex and the concave bends at the edge of the metal and, second, the metal is presented first at one angle and then at a reversed angle so the successive dies, whereby said dies operate to remove the metal in a manner to not only cut away the rough edges left on the saw-toothed edge of the metal by the rotary milling cutters but also to act upon the metal at the convex and concave bends thereof so as to produce the bevels $f\ g$ on the material. one of said dies acting in a path inclined to the medial line of the fastener to produce bevels $f$ on the concave bends at one surface of the corrugated metal, and the other die acting similarly in a path inclined to the medial line of the corrugated metal to produce bevels $g$ upon the concave bends at the other surface of the corrugated metal.

As disclosed in the two later applications Serial Nos. 865,678 and 19377, the machines and process treat the corrugated metal by first swaging the driving edge to produce metal fillets constituting the reversed bevels on the convex bends of the respective surfaces of the fastener, and thereafter the two cutting dies are provided with corrugated surfaces conforming to the corrugated metal so as to act upon the convex and concave bends of said corrugated metal, one die operating upon one surface and the other die upon the other surface and the two said dies cutting the metal on lines inclined to the medial line of the corrugated metal, whereby the reciprocating action of the corrugated faced dies and the presentation of the metal in first one inclined position and then in a reversed inclined position coöperate in the production of a fastener having the desired saw teeth with the continuous cutting edge for the reason that the dies not only cut out the metal of the fillets on well defined lines so as to form the teeth B but said dies owing to their corrugated form and the angle of the metal also shear the metal along the concave bends upon the respective surfaces of the metal so as to produce the bevels *f g*.

Figure 3:
Fig. 3 is a cross section on the line 3—3 of Fig. 1, said Fig. 3 being on a greatly enlarged scale in order to clearly define the form of the sharpened and centrally positioned point of the saw tooth.

It is apparent that each tooth is beveled at *c* or *d* on the convex surface and at *f* or *g* on the concave surface, reference being had more particularly to the greatly enlarged view Fig. 3, which bevels as *c f* on one tooth or *d g* on the next tooth produce the desired continuous cutting edge at the driving part of the fastener and enable it to more easily penetrate the material, either with the grain or across the grain of the wood.

Another salient feature of our fastener is that the points *e* of the teeth are centrally positioned in the plane of the medial line of the fastener, and such points *e* are swaged so as to effectively sharpen them, said central position of the teeth being important in securing straight driving of the fastener into the material, *i. e.* to preclude deflection of the fastener either to the right or to the left of a given line during the driving operation. As set forth in each of said prior applications, the points of the teeth B are swaged by the action of a die, the effect of which is to compress the metal on the faces of the tooth, such swaging being graphically shown at *e'* in the enlarged view Fig. 3. The swaging die is constructed and operated to act upon the lateral faces *e'* of the teeth, but preferably not upon the points *e*, whereby said die positions the teeth so that their points are in the plane of the medial line of the fastener and the points are sharpened, the operations of positioning and sharpening the teeth being performed simultaneously.

Figures 4, 5:
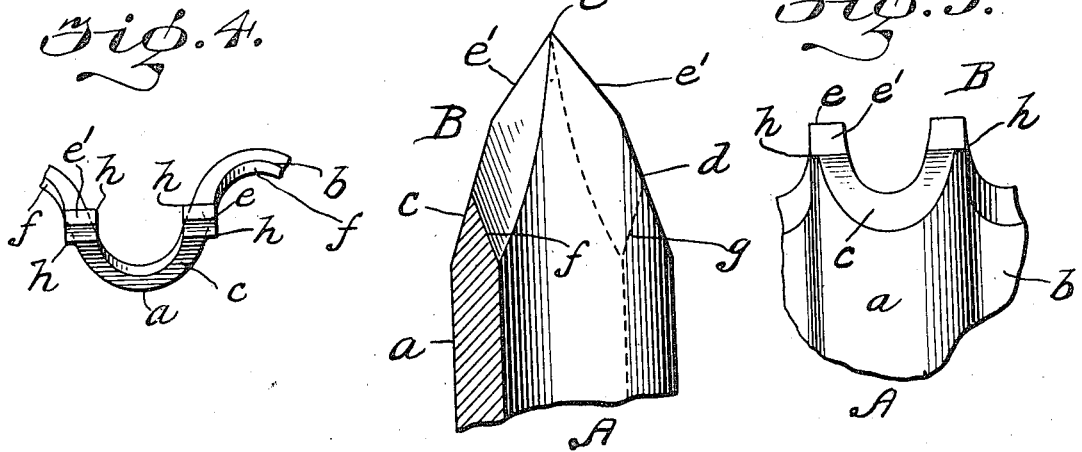
Figs. 4 and 5 are views on an enlarged scale of a further embodiment of the fastener wherein each tooth is provided with a barb or shoulder to prevent withdrawal of the fastener when driven into the material.

As shown in Figs. 4 and 5, each tooth of the fastener is shown as having a shoulder *h* formed thereon in the process of making said fastener, whereby said shoulder is adapted to serve as a spur or barb in preventing the withdrawal of the fastener when driven into the material, usually wood. The shoulder is formed, as shown, below the extreme point of the tooth, and it is positioned to project beyond the normal lines of the tooth so that it will catch in the wood and operate, to a certain extent, as an anchor in preventing the fastener from being withdrawn. The spur or barb is formed on the tooth as a result of the combined cutting operation and the swaging operation, the line of cut being such that the metal is left on the tooth to be subsequently positioned by the swaging die and result in the spur or shoulder, as shown.

It is at times desirable to impart a relatively keen edge to the points of the tooth in order that the fastener may readily cut its way into hard wood or to drive into wood the fibers of which oppose the easy penetration of the metal. Accordingly, we find it desirable at times to grind the extreme points of the sharpened teeth.

Having thus fully described the invention, what we claim as new, and desire to secure by Letters Patent is:

1. A fastener comprising a strip of metal continuously bent and rebent to form corrugations extending alternately on each side of the central plane of the fastener, one edge of said fastener being beveled on each side thereof, thereby forming a series or succession of teeth and each corrugation being beveled on both the convex and the concave side adjacent the bottom of each tooth.

2. A corrugated fastener comprising a length of corrugated metal provided on one edge with saw teeth, the metal on opposite sides of which is beveled to produce a cutting edge at all points on said saw tooth edge.

3. A corrugated fastener comprising a length of corrugated metal stock provided with a series of saw teeth, the concave and convex surfaces on each side of the fastener being provided with bevels adjacent the bases of the teeth.

4. A corrugated fastener comprising a length of corrugated metal stock provided on one edge with well defined saw teeth, the edges of which teeth are sharpened and accurately positioned in the plane of the medial line of the corrugated metal.

5. A corrugated fastener comprising a length of corrugated metal stock the edge portion of which is cut to produce a series of saw teeth, the concave and convex surfaces of the stock on each side thereof being provided with bevels at the bases of said teeth, the protruding edges of said teeth being sharpened and accurately positioned in the plane of the medial line of the fastener.

6. A corrugated saw tooth fastener the teeth of which are sharpened at their extreme edges and are provided with spurs or barbs below said edges, said spurs or barbs projecting in the same general direction as said edges.

In testimony whereof we have hereunto subscribed our names.

SPENCER C. CARY.
HERMAN H. BRAND.